US006131765A

United States Patent [19]

Barry et al.

[11] Patent Number: 6,131,765

[45] Date of Patent: Oct. 17, 2000

[54] DEVICE FOR STORING AND DISPENSING SOLID-FORM MEDICATION

[76] Inventors: William Dean Barry, 5131 Summerhill Rd.; Reggie Goins, 60 Lanshire, both of Texarkana, Tex. 75503

[21] Appl. No.: 09/226,936

[22] Filed: Jan. 8, 1999

[51] Int. Cl.[7] .................... B65G 59/00

[52] U.S. Cl. .................... 221/264; 221/268

[58] Field of Search .................... 221/264, 268, 221/247, 254, 1, 124, 92, 174, 270

[56] References Cited

U.S. PATENT DOCUMENTS

| | | |
|---|---|---|
| 424,180 | 3/1890 | Cobb . |
| 452,635 | 5/1891 | Dieterich . |
| 649,072 | 5/1900 | Pfahler . |
| 676,798 | 6/1901 | Mullins . |
| 683,053 | 9/1901 | Kottusch . |
| 825,078 | 7/1906 | Schoen . |
| 1,444,863 | 2/1923 | Baird . |
| 1,449,864 | 2/1923 | Lillis . |
| 1,503,277 | 7/1924 | Mulford . |
| 1,600,158 | 9/1926 | Williams . |
| 1,607,014 | 11/1926 | Moak . |
| 1,766,298 | 6/1930 | Macke . |
| 1,814,955 | 7/1931 | Oddsen . |
| 1,981,135 | 11/1934 | Block . |
| 2,039,282 | 5/1936 | Burke . |
| 2,044,441 | 6/1936 | Nuss . |
| 2,475,738 | 7/1949 | Epplin . |
| 2,683,554 | 7/1954 | Mulhauser, Jr. . |
| 2,774,470 | 12/1956 | Q'Part . |
| 2,806,633 | 9/1957 | Thomen . |
| 2,971,675 | 2/1961 | Allegri . |
| 3,342,373 | 9/1967 | Weitzman . |
| 4,004,719 | 1/1977 | Weitzman . |
| 4,168,019 | 9/1979 | Hausam . |
| 4,216,878 | 8/1980 | Naud . |
| 4,230,237 | 10/1980 | de Witt . |
| 4,319,700 | 3/1982 | Celender et al. . |
| 4,440,322 | 4/1984 | Henry . |
| 4,476,997 | 10/1984 | Lacroix et al. . |
| 4,516,701 | 5/1985 | Tribble . |
| 4,562,941 | 1/1986 | Sanfilippo . |
| 4,673,111 | 6/1987 | Gold . |
| 4,718,578 | 1/1988 | Radek et al. . |
| 4,744,492 | 5/1988 | Hackmann et al. . |
| 4,767,023 | 8/1988 | Hackmann et al. . |
| 4,784,291 | 11/1988 | Melucci . |
| 4,790,451 | 12/1988 | Cassou et al. . |
| 4,836,424 | 6/1989 | Afshar . |
| 4,964,546 | 10/1990 | Morrow et al. . |
| 4,966,305 | 10/1990 | Hinterreiter . |
| 4,972,802 | 11/1990 | Huddleston et al. . |
| 5,018,644 | 5/1991 | Hackmann et al. . |
| 5,044,350 | 9/1991 | Iwabuchi et al. . |
| 5,109,799 | 5/1992 | Lader . |
| 5,148,944 | 9/1992 | Kaufman et al. . |
| 5,259,531 | 11/1993 | Bennett . |

*Primary Examiner*—Kenneth W. Noland
*Attorney, Agent, or Firm*—Fulbright & Jaworski L.L.P.

[57] ABSTRACT

A method and apparatus for storing and dispensing solid-form medication ("pills") is disclosed. In a preferred embodiment a housing is provided wherein a hopper for storing pills is contained. A slide drawer is contained within the housing just below the hopper, and a moveable slide is contained within the slide drawer. A hole is provided in the bottom of the hopper, which opens into the slide drawer. A second hole is provided in the moveable slide, and a third hole is provided in the bottom of the slide drawer. The hole at the bottom of the hopper and the hole at the bottom of the slide drawer are not aligned. As the moveable slide is pulled outward, at some point the hole provided within the slide and the hole at the bottom of the hopper become aligned, which allows a pill to drop into the slide's hole within the slide drawer. As the slide is returned inward, at some point the slide's hole becomes aligned with the hole at the bottom of the slide drawer, which allows the pill to drop out of the slide drawer. In a preferred embodiment, a trap door is rotatably attached to the bottom of the housing to catch a pill when it falls through the hole at the bottom of the slide drawer. Thereafter, a user may open the trap door and retrieve the pill. A display may be attached to the housing to provide information relating to the pills stored and/or dispensed.

28 Claims, 3 Drawing Sheets

DEVICE FOR STORING AND DISPENSING SOLID-FORM MEDICATION

BACKGROUND

Due to various types of health problems, some people are required to take multiple doses of medicine each day. Treatment of such health problems often requires close compliance with relatively complex medication regimes. It is not unusual for a person having a serious health problem to be taking four or more different prescription drugs at one time. These drugs often differ significantly in dosages, both as to time and amount, as well as in their intended physiological effects. These drugs also often differ in the severity of potentially adverse reactions due to mismedication.

Close and careful compliance with these complex medication regimes is a difficult task in itself. The difficulty is greatly enhanced, considering that the patient must discipline his/herself to follow these regimes at home, without the day-to-day support and supervision of trained medical personnel. Furthermore, a loss in short term memory can be naturally attributed to some illnesses and to the medication themselves, resulting in forgetfulness and further confusion in scheduling compliance with complicated medication regimes.

Furthermore, in order to make medication containers "child proof," many of such containers have become very difficult to open. This is especially true for older persons or persons with serious illnesses who may be too weak to open such containers.

Further still, many patients require an additional supply of pills/capsules after their initial supply is depleted. Some patients are required to take pills/capsules over very long periods of time, which may require that the patient obtain an additional supply of pills/capsules on a monthly basis. It may be crucial that a patient receive each and every dosage of a particular medication. However, some patients may not remember to obtain a new supply of pills/capsules until the previous supply is completely depleted, in which case it may be too late to obtain a new supply prior to the time that the next dosage is required to be taken.

Moreover, it may be difficult for some patients to read the somewhat fine print on traditional pill/capsule bottles. This may add to the difficulty of properly administering a regime of pills/capsules correctly. Additionally, traditional pill/capsule bottles are easily lost or misplaced.

Therefore, there exists a desire for a method and device for storing and dispensing pills/capsules. There exists a further desire for such a method and device that may provide information to a user to assist the user in administering such solid-form medications.

SUMMARY OF THE INVENTION

These and other objects, features and technical advantages are achieved by method and apparatus for storing and dispensing solid-form medication. The disclosed invention provides a method and device for storing and dispensing medication in the form of individual pills, capsules, tablets, or other solid-form medication. Such solid-form medication is referred to hereafter simply as "pills," but the invention is intended to encompass storing and dispensing any type of solid-form medication. A preferred embodiment of such a device is shown in FIG. 1. As shown in FIG. 1, the preferred embodiment has a housing 101 that encloses a storage chamber (i.e., a hopper) 106 for holding at least one pill. Preferably, the inner walls 110, 132 and 134 (the latter 2 inner walls are shown in FIG. 2) of hopper 106 are sloped in order to direct pills contained therein to a hole 112 at the bottom of hopper 106. Preferably, inner wall 108 is not sloped, but inner wall 109 (or "lip" 109) is sloped from inner wall 108 toward the bottom of hopper 106 to aid in directing pills toward hole 112. Hole 112 opens into a "slide drawer" compartment 114 below hopper 106. A moveable slide 118 is contained within the slide drawer 114. Slide 118 has a hole 120 near the end opposite handle 116. At some point as slide 118 is pulled outward, hole 120 becomes aligned with hole 112, which allows a pill to drop through hole 112 into hole 120. That is, when hole 120 is aligned with hole 112, a pill may drop into hole 120 and reside within the slide drawer 114. Preferably, a mechanism that operates as a stopper (not shown) is provided within slide drawer 114 to prevent slide 118 from being pulled completely out of housing 101.

Slide drawer 114 has a hole 122 with which hole 120 is aligned when slide 118 is returned to its initial/resting position (e.g., pushed inward). Hole 122 opens to trap door 126. Accordingly, a pill residing within hole 120 will drop through hole 122 when slide 118 is returned to its initial/resting position. Thus, such a pill will drop through hole 122 into trap door 126. Trap door 126 may have a handle 124. When sufficient pressure is applied downward on handle 124, trap door 126 will open to allow a user to retrieve a pill. Trap door 126 may also have a stopper 128, which controls the width that trap door 128 will open.

To provide added functionality, housing 101 may be equipped with a mechanism for mounting the device on a wall. Alternatively, housing 101 may be equipped with a support mechanism, such as a stand, that would allow the device to be placed on any relatively flat surface. Also, the device may be available in a variety of different colors. This would allow a user to coordinate the device with the decor of the room in which the device may be placed, such as the user's bathroom. Also, this provides the added functionality of allowing a user to color code pills contained within a particular device. Additionally, the preferred embodiment may be equipped with a transparent slot in which a user may insert a label from the pills' original bottle. Such a label may provide information such as the name of the medication, instructions relating to dosages (e.g., how many times a day to take the pill), symptoms for which the pills should be taken, and other information relating to the pills contained within the preferred embodiment. Such a transparent slot may be located in a variety of positions on the preferred embodiment. For example, the transparent slot may be located on the front or the side of the housing, or it may be located under a lid 102 that may be attached to the top of housing 101.

To provide the user additional information and thereby increasing the functionality of the disclosed device for storing and dispensing pills, the device may be equipped with a display to provide the user with a variety of information. The following details a few examples of such information that such a display may provide. The display may provide the user with how many pills have been dispensed, the time that the last pill was dispensed, the current time, and the time that the next pill is to be taken. The display may also allow a user to set an alarm to remind the user to take a pill at a certain time. The display may also notify the user when the pills stored in hopper 106 are nearly depleted, so that the user may replenish the supply. The display may also allow the user to enter the expiration date for such pills to allow a user to avoid taking a pill after its expiration date. The display may provide the current temperature, to allow a user to monitor the temperature of pills that must be stored at or below certain temperatures. The display may also provide a specific number of pills contained within the device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
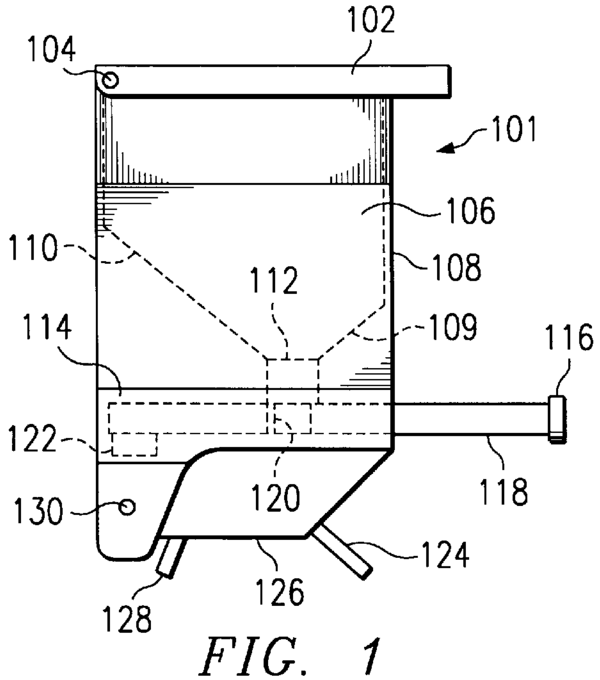
FIG. 1 shows a side view of a preferred embodiment.

Turning to FIG. 1, a side view of a preferred embodiment of an apparatus for storing and dispensing pills is shown. The outer housing 101 of the apparatus may be made of any material appropriate for storing pills, such as wood or metal, but in the preferred embodiment such housing is made of a plastic material. A lid 102 may be connected to the top of the housing 101, and the lid may also be made of material appropriate for storing pills (preferably made of a plastic material). Lid 102 may be rotatably connected to housing 101 by a hinge 104 to allow lid 102 to be opened and closed without requiring lid 102 to be completely removed from the housing 101.

Figure 2:
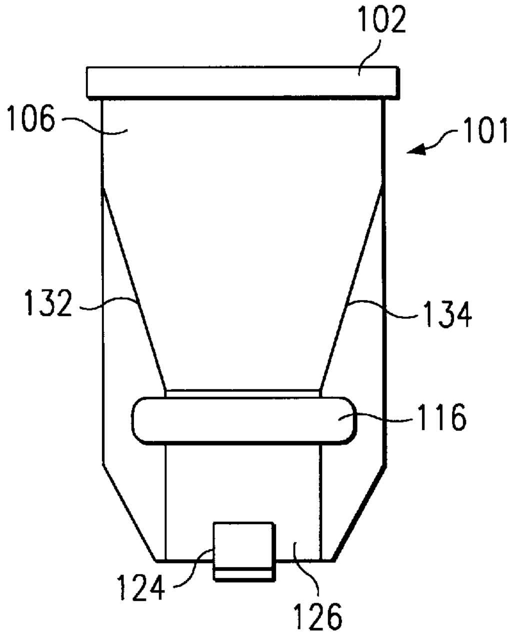
FIG. 2 shows a front view of the preferred embodiment.

Inside of the housing 101, is hopper 106 wherein pills may be stored. Preferably, the inner walls 110, 132 and 134 (the latter 2 inner walls are illustrated in FIG. 2) of hopper 106 are sloped such that pills are directed toward hole 112 at the bottom of hopper 106. Preferably, inner wall 108 of hopper 106 is not sloped, but inner wall 109 (or "lip" 109) is sloped from inner wall 108 toward the bottom of hopper 106. Thus, inner walls 108 and 109 also work to direct pills toward hole 112. It should be understood that in an alternative embodiment inner wall 108 may also be sloped. Additionally, alternative embodiments of the present invention may have any one or more of the inner walls of hopper 106 sloped to direct pills toward hole 112.

Hole 112 opens into slide drawer 114, wherein slide 118 resides. Slide 118 is of a width and a thickness such that it fits securely within slide drawer 114. That is, slide 118 substantially fills the entire slide drawer 114, leaving very little space between slide 118 and the sides of slide drawer 114. Slide 118 may have a handle 116 that allows a user to pull slide 118 outward or push slide 118 inward. Slide 118 has a hole 120, which when aligned with hole 112 allows a pill to drop into slide drawer 114. Hole 120 is an aperture completely through slide 118, such that as slide 118 returns to its initial position having a pill in hole 120, such a pill will be moved along slide drawer 114 within hole 120.

Slide 118 may be installed in housing 101 in a manner such that slide 118 is pushed in when in its initial/resting position. For example, slide 118 may be installed within slide drawer 114 with a spring (not shown) that supplies the resistance necessary to keep slide 118 pushed in. It should be understood that such a spring must be strong enough to keep slide 118 pushed in, and such a spring must be weak enough to allow a person to pull slide 118 outward in order to allow a pill to fall into hole 120. Slide drawer 114 may be equipped with a stopper that prevents slide 118 from being completely removed from housing 101. Preferably, the stopper is positioned within slide drawer 114 such that as slide 118 is being pulled outward the stopper will cause slide 118 to be stopped when holes 112 and 120 are aligned.

Slide drawer 114 also has a hole 122. Accordingly, when slide 118 returns to its initial position (e.g., its resting position), hole 120 in slide 118 and hole 122 in slide drawer 114 are aligned. Therefore, if slide 118 returns to its initial position with a pill contained in hole 120, such pill will fall through hole 122. The preferred embodiment may also provide a trap door 126 to catch a pill that falls through hole 122. Such a trap door may be useful for "catching" a pill for a user. That is, a user is not required to catch a pill as it is dispensed through hole 122. Thus, trap door 126 may prevent dispensed pills from falling to the floor. Trap door 126 is also useful in that it may allow a user to operate the device using only 1 hand. If a trap door 126 is provided, a user is not required to operate slide 118 with one hand and simultaneously attempt to catch a dispensed pill with the other hand. Rather, with trap door 126 a user can use one hand to operate slide 118 and trap door 126 will catch the dispensed pill. Thereafter, a user may use the same hand to retrieve the dispensed pill from trap door 126.

Trap door 126 may have a handle 124 that allows a user to open trap door 126 by applying sufficient pressure downward on handle 124. Additionally, trap door 126 may have a stopper 128 that allows trap door 126 to be opened only to a certain extent. Trap door 126 may be rotatably connected to housing 101 by hinge 130. Trap door 126 may be connected to housing 101 in a manner that trap door 126 is closed in its resting position. For example, trap door 126 may be connected with a spring (not shown) that supplies the resistance necessary to keep trap door 126 closed. It should be understood that such a spring should be strong enough to keep trap door 126 closed with the weight of a pill residing in the trap door, and such a spring should be weak enough to allow a person to open trap door 126 in order to retrieve a pill.

In a first alternative embodiment, slide 118 may be in an outward position in its initial/resting state. In this manner, hole 120 in slide 118 is initially aligned with hole 112 in the bottom of hopper 106. Accordingly, as a pill within hopper 106 reaches hole 112, it will fall to hole 120. As hole 120 receives 1 or more pills, such pills contained within hole 120 may work to prevent other pills contained within hopper 106 from falling into hole 120. For example, hole 120 may be of a size that only 1 pill of a particular size may fit within hole 120 at any given time. In this first alternative embodiment, a user may cause a pill to be dispensed by pushing slide 118 inward. As slide 118 is pushed inward, hole 120 containing 1 or more pills becomes aligned with hole 122, which allows the pill(s) contained within hole 120 to fall through hole 122. Preferably this first alternative embodiment would have a trap door 126 for catching the pill(s).

According to this first alternative embodiment, slide 118 may be installed within slide drawer 114 with a spring (not shown) that supplies the resistance necessary to keep slide 118 pushed outward when in its initial/resting position. It should be understood that such a spring must be strong enough to keep slide 118 pushed outward, and such a spring must be weak enough to allow a person to push slide 118 inward in order to allow a pill to fall into hole 120.

In other alternative embodiments, hole 112 in the bottom of hopper 106, hole 120 in slide 118, and hole 122 in the bottom of slide drawer 114 may be rearranged in some other positions. That is, holes 112, 120 and 122 may be positioned in many different combinations such that holes 112 and 122 are not aligned and hole 120 is capable of being aligned with holes 112 and 122 as slide 118 is moved within slide drawer 114.

Turning to FIG. 2, a front view of the preferred embodiment is shown. Lid 102 is shown atop housing 101. Hopper 106 is shown, wherein pills are stored. Walls 132 and 134 of hopper 106 are also shown. Handle 116 for slide 118 is shown just above trap door 126 having its own handle 124.

Figure 3:
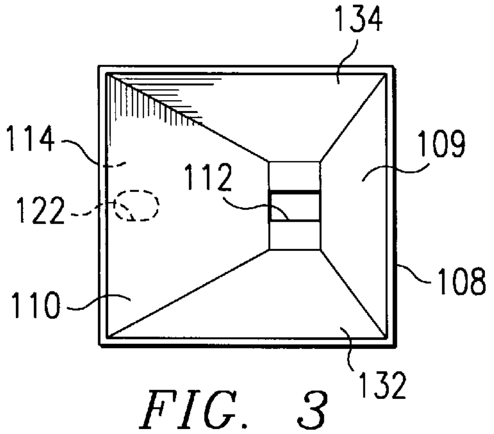
FIG. 3 shows a top view without a lid on the preferred embodiment.

Turning to FIG. 3, a top view of the preferred embodiment is shown with lid 102 removed. Looking inside hopper 106 from this top view, it can be seen that inner walls 108, 109, 110, 132 and 134 direct the stored pills toward hole 112 at the bottom of hopper 106. Hole 112 opens into the slide drawer 114 wherein slide 118 (not shown) resides. Slide drawer 114 contains hole 122, which opens into trap door 126 (not shown). It should be noted that hole 112 and hole 122 are not aligned.

Figure 4:
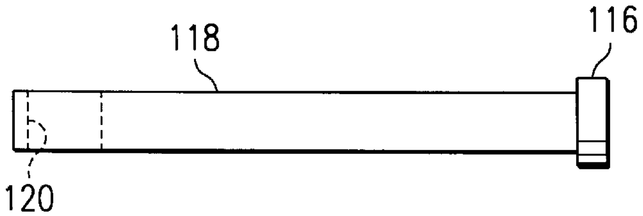
FIG. 4 shows a slide used in the preferred embodiment.

Turning to FIG. 4, a preferred embodiment of slide 118 is shown. Slide 118 may have a handle 116 that allows a user to pull/push slide 118 in order to move the slide within the slide drawer 114. Slide 118 contains hole 120, which when aligned with hole 112 (not shown) allows a pill to drop into the slide drawer 114 and when aligned with hole 122 (not shown) allows a pill to fall through hole 112.

Figure 5:
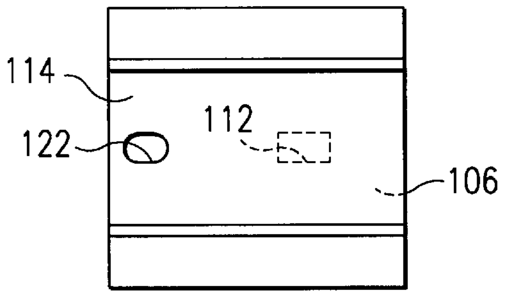
FIG. 5 shows a bottom view without a trap door on the preferred embodiment.

Turning now to FIG. 5, a bottom view of the preferred embodiment is shown with trap door 126 removed. As shown, hole 122 leads up into slide drawer 114, wherein slide 118 (not shown) resides. On the top of slide drawer 114 there is hole 112 that leads up to hopper 106, wherein pills (not shown) are stored.

Figure 6:
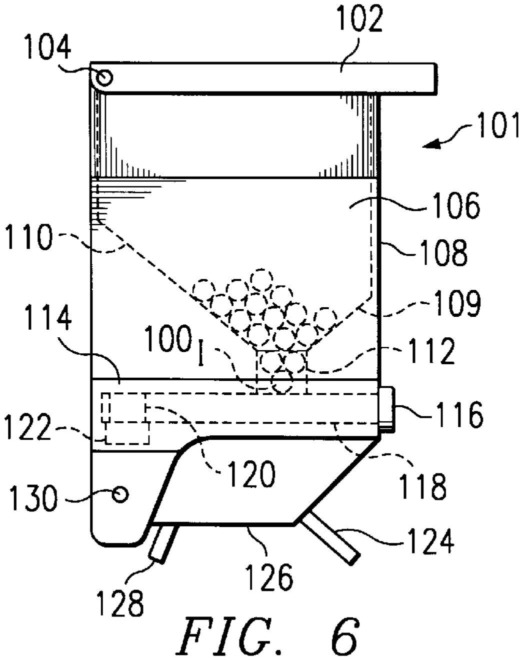
FIG. 6 shows a side view of the preferred embodiment in its initial state.
Figure 7:
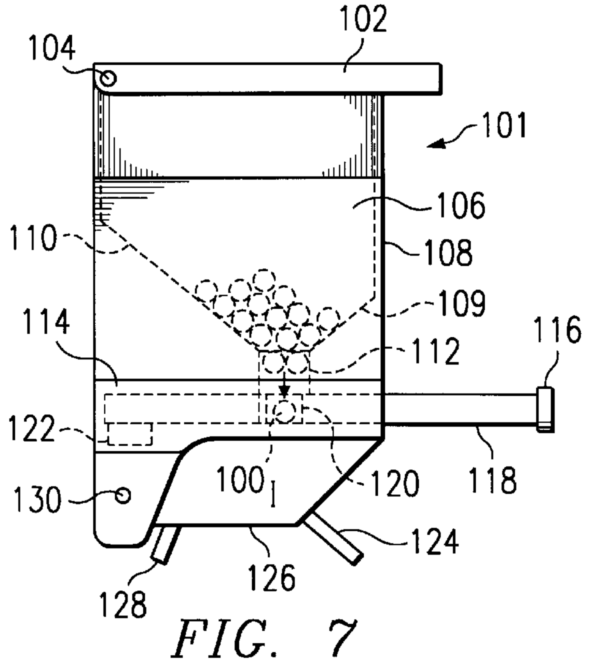
FIG. 7 shows a side view of the preferred embodiment in its secondary state with the slide being pulled out by a user.
Figure 8:
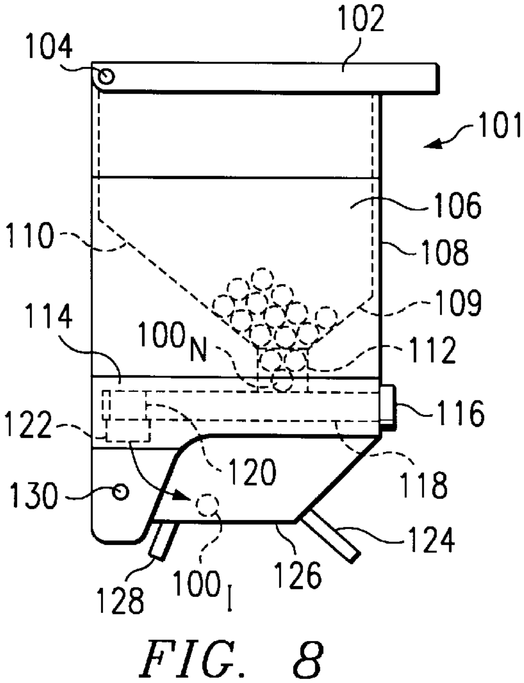
FIG. 8 shows a side view of the preferred embodiment in its final state with the slide being returned to its initial position.

Turning now to FIGS. 6–8, operation of the preferred embodiment is illustrated. Turning first to FIG. 6, the preferred embodiment is shown in its initial/resting state. Pills have been stored in hopper 106 by opening lid 102 and placing the pills into hopper 106. Inner walls 110, 108 and 109, along with walls 132 and 134 (not shown), direct the pills toward hole 112 at the bottom of hopper 106. Pill $\mathbf{100}_I$ resides in hole 112 atop slide drawer 114. Slide 118 is in its initial/resting position within slide drawer 114 (i.e., pushed inward). Likewise, trap door 126 is in its initial/resting position (i.e., closed).

Turning to FIG. 7, a secondary/intermediary state of the preferred embodiment is shown. At this point, a user desiring to receive a pill has pulled slide 118 outward. At some point as slide 118 is pulled outward, hole 120 becomes aligned with hole 112 allowing pill $\mathbf{100}_I$ to fall into hole 120. Slide 118 may be stopped by a stopper within slide drawer 114 (not shown) at a position where hole 120 is aligned with hole 112, which allows pill $\mathbf{100}_I$ to drop into hole 120 within slide drawer 114.

Turning to FIG. 8, the fmal state of the preferred embodiment is shown. It should be recognized that this final state is identical to the initial/resting state illustrated in FIG. 6. In this final state, slide 118 has returned to its initial/resting position either by a user pushing the slide inward or by some mechanism, such as a spring, pulling the slide inward. Accordingly, hole 120 containing pill $\mathbf{100}_I$ becomes aligned with hole 122. Therefore, pill $\mathbf{100}_I$ drops through hole 122. Housing 101 may have a trap door 126 into which pill $\mathbf{100}_I$ may fall. The next pill to be received, pill $\mathbf{100}_N$, has positioned itself in hole 112 within hopper 106.

Figure 9:
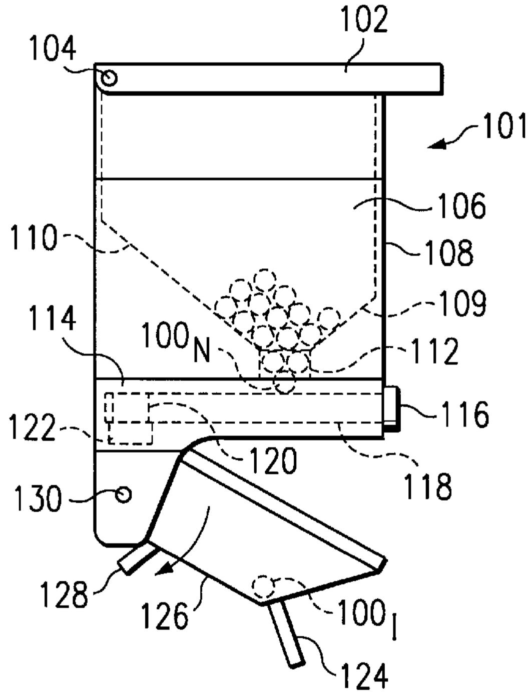
FIG. 9 shows a side view of the preferred embodiment with a trap door being opened to allow a pill to be retrieved.

At this point a user may open trap door 126, as illustrated in FIG. 9, to retrieve pill $\mathbf{100}_I$. In the preferred embodiment, trap door 126 has handle 124, which may allow a user to open trap door 126 by applying sufficient pressure downward. In the preferred embodiment, trap door 126 also has stopper 128 to control the opening width for trap door 126. Hinge 130 rotates to allow trap door 126 to open when sufficient pressure is applied downward on handle 124, in the preferred embodiment. Also in the preferred embodiment, some mechanism, such as a spring (not shown), is connected to trap door 126 to cause trap door 126 to return to its closed position once sufficient pressure is no longer applied to handle 124.

To provide added functionality, housing 101 may be equipped with a mechanism for mounting the device for storing and dispensing solid-form medication on a wall or other structure. This would allow a user to mount the device on his/her bathroom wall, or the device may be mounted on a wall in a hospital room or a doctor's office. Housing 101 may be equipped with a mechanism to allow the device for storing and dispensing solid-form medication to mounted in a refrigerator. For example, the device may be equipped with hooks on the back of housing 101 that will allow the device to be hooked onto a shelf on the door of a refrigerator. Such a mechanism for mounting the device within a refrigerator would allow the device to store pills that must be stored at refrigerated temperatures.

Alternatively, housing 101 may be equipped with a support mechanism, such as a stand, that would allow the device to be placed on any relatively flat surface. For example, a user unable to get out of bed may place the device having a support mechanism on a night stand beside the user's bed. This embodiment has the added benefit of allowing the device to be more mobile than being mounted on a wall. Accordingly, a user may take the device with him/her on a trip without having to remove the mounted device from the wall.

In addition, it is conceivable that pills stored within hopper 106 may become lodged in a manner such that no pill is able to reach hole 112. To assist in dislodging the pills to allow a pill to reach hole 112, some agitation means may be provided with the preferred embodiment. For example, a mechanical vibrating device may be attached to the housing 101. This may allow a user to turn on the vibrating device to jar the pills such that a pill may reach hole 112. As another example, a rod may be supplied that reaches into hopper 106. Such a rod may allow a user to stir the pills contained within hopper 106 in order to dislodge them and allow a pill to reach hole 112.

To provide added functionality, the device for storing and dispensing solid-form medication may be available in a variety of different colors. This would allow a user to coordinate the device with the decor of the room in which the device may be placed, such as the user's bathroom. Also, this provides the added functionality of allowing a user to color code pills contained within a particular device. For example, a user may have 3 of the disclosed devices, each for a different type of pill. By using a different colored device for each type of pill, the user is able to color code the pills. This may be helpful in reminding the user which type of pill is contained within each device.

Additionally, the preferred embodiment may include a transparent slot in which a user may insert a label from the pills' original bottle. Such a label may provide information such as the name of the medication, instructions relating to dosages (e.g., how many times a day to take the pill), symptoms for which the pills should be taken, and other information relating to the pills contained within the preferred embodiment. Such a transparent slot may be located in various positions on the preferred embodiment. For example, the transparent slot may be located on the front or the side of the housing. Because a label may be unsightly and may contain sensitive information, the transparent slot may be located on the underside of lid 102. This would prevent casual viewers of the preferred embodiment from viewing the label, while allowing a user the ability to open lid 102 to view the label.

Figure 10:
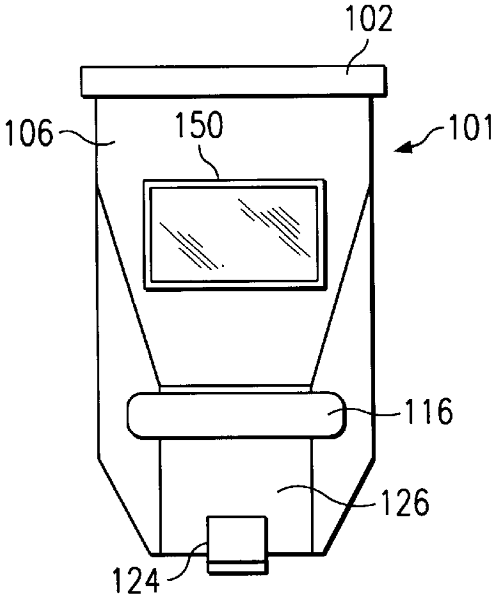
FIG. 10 shows a front view of the preferred embodiment having a display attached thereto.

To provide the user additional information and thereby increasing the functionality of the disclosed device for storing and dispensing solid-form medication, housing 101 may be equipped with a display 150, as shown in FIG. 10. Display 150 may provide the user with a variety of information. The following details a few examples of such information that display 150 may provide, of which display 150 may provide any one or any combination of the following information. The display may provide the user with information, such as how many pills have been dispensed, the time that the last pill was dispensed, the current time, and the time that the next pill is to be taken. The display may also allow a user to set an alarm to remind the user to take a pill at a certain time. The display may also notify the user when the pills stored in hopper 106 are nearly depleted, so that the user may replenish the supply. The display may also allow the user to enter the date on which pills are added to hopper 106 and/or the expiration date for such pills to allow a user to avoid taking a pill after its expiration date. Each of the aforementioned exemplary functions for display 150 are described in more detail hereafter.

Display 150 may contain a clock that displays the current time. Such a clock would preferably be digital, but it may be analog. Display 150 may be powered in several ways, such as by a battery or by an AC outlet. Display 150 may allow a user to set the current time. Display 150 may also include an alarm that a user may set. The display may allow a user to set a reoccurring alarm or a one time alarm. A reoccurring alarm would sound at certain time(s) each day, which may be used to remind a user to take a pill. A one time alarm would require the user to reset the alarm after each time that it activates. Such an alarm may have a verbal warning, such as a repetitive beep, it may have a visual warning, such as a flashing display, or a combination of both.

Display 150 may provide a resettable counter that displays the number of pills dispensed. The counter would preferably be a digital counter, but it may be a non-digital counter. The counter may be incremented in a variety of ways. For example, a sensor may be placed within housing 101 to detect when a pill has been dispensed. Such a sensor may be placed on slide 118 to detect when it has been pulled completely outward to allow a pill to drop into slide drawer 114. However, this arrangement may allow for the counter to be incremented without a pill actually being dispensed because a user may pull slide 118 outward without receiving a pill from hopper 106 (e.g., if hopper 106 is empty). More preferably, such a sensor may be placed within or under hole 122 to detect a pill passing through hole 122. This arrangement would allow the counter on display 150 to be incremented only when a pill has passed through hole 122 into trap door 126.

Such a counter may be reset by the user. The counter may be reset manually by a user, or the user may be able to set a particular time for the counter to automatically reset. For example, the user may set 12:00 midnight as the time for the counter to automatically reset for each day, which would cause the counter to display only the number of pills dispensed on a particular day.

Such a counter may be valuable to a user by notifying the user how many pills have been dispensed. This may allow a user to monitor his/her dosage. For example, suppose a user is to take a pill 3 times daily. By resetting the counter each day, either manually or automatically, the counter will notify the user how many pills have been dispensed thus far on a particular day. If the user is unable to recall whether he/she has previously taken either of the 3 dosages on a particular day, the counter will provide a reminder to help prevent the user from taking an incorrect dosage. Furthermore, such a counter may be valuable to a doctor or other care-giver in monitoring the user's dosage and/or performance. For example, a doctor may use the counter to monitor the number of pain killers taken over a period of time by the user. This information may allow the doctor to determine whether the user is recovering properly, whether the user is abusing the pain killers, whether the user's prescription should be changed, or make other determinations based on this information.

Display 150 may notify a user when pills contained in hopper 106 are nearly depleted. The amount of pills contained in hopper 106 may be ascertained in a variety of ways. For example, a sensor may be placed within hopper 106 to detect when the pills fall below a certain level. That is, when the stack of pills in hopper 106 fall below a certain level (e.g., 1 centimeter from the bottom of the hopper) the sensor may detect that the pills are nearly depleted. Once it is ascertained that the pills stored in hopper 106 are nearly depleted, display 150 may provide a verbal warning, a visual warning or a combination of both. Such a warning may be valuable to a user who needs to replenish the supply of pills, by helping to prevent such a user from completely depleting their supply of pills prior to obtaining a new supply. Alternatively, all or a portion of housing 101 may be of a transparent material, such as glass, to allow a user to view the amount of pills remaining in hopper 106. In yet another alternative, housing 101 may provide a transparent window area, through which a user may view the amount of pills remaining in hopper 106.

Display 150 may provide information about the time (which may include the date) at which the last pill was dispensed. Ascertaining the time at which the last pill was dispensed may be accomplished in a variety of ways. For example, a sensor may detect when a pill passes through hole 122 into trap door 126. Display 150 may be equipped with a memory device, and a detection of a pill passing through hole 122 may cause display 150 to store the time at which such detection occurred in its memory. Thereafter, a user may be able to press a key on display 150 to retrieve the time at which the last pill was dispensed. Alternatively, a portion of display 150 may continually show the time at which the last pill was dispensed, and such display may be updated to show the last time at which a pill was detected passing through hole 122.

Additionally, display 150 may provide a mechanism that allows a user to enter his/her dosage schedule. For example, suppose a user is to take 3 pills each day at the following schedule: 1 pill at 9:00 a.m., 1 pill at 12:30 p.m., and 1 pill at 5:30 p.m. The user may enter this schedule in display 150, and display 150 may store this information in its memory. As discussed above, display 150 may provide an alarm to notify the user that it is time to take a pill. Also, display 150 may display the time at which the next pill is to be taken.

Display 150 may also allow the user to enter the date on which pills are added to hopper 106 and/or the expiration date for such pills. The display may then provide a visual reminder for the user as to the expiration date of the pills contained therein. Also, display 150 may provide an alarm to notify the user when the expiration date for the pills contained therein has been reached. Such alarm may be activated when a pill is dispensed on or after the set expiration date. This information will be valuable to inform the user of the expiration date for the pills contained in the device to ensure that the pills are not outdated.

Additional features may be added to display 150 to increase the functionality of the device for storing and dispensing solid-form medication. For example, the current temperature may be shown on display 150. The temperature may be valuable information for pills that must be stored at or below a certain temperature. As a further example, the device for storing and dispensing solid-form medication may have a counting mechanism that counts the exact number of pills inserted in hopper 106. The display may then display the exact number of pills remaining within hopper 106 by subtracting each pill that is dispensed from the running total and adding each pill inserted into hopper 106 to the running total of pills stored in hopper 106.

Figure 12:
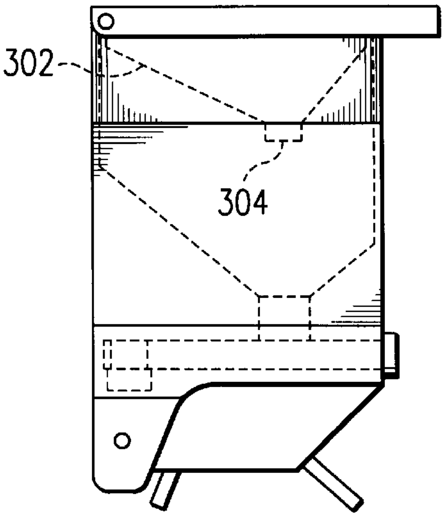
FIG. 12 shows a side view of an alternative embodiment that includes a funnel through which pills pass when being inserted into the hopper.

One example of a mechanism that may be used to count the number of pills inserted in hopper 106 is shown in FIG. 12. As pills are inserted into hopper 106 they are directed through funnel 302 having hole 304 at its bottom. A sensor may be placed at the bottom of hole 304 to detect as each pill passes through it. As each pill passes through hole 304, a counter may be incremented to increase the running total of pills contained within hopper 106.

Figure 11:
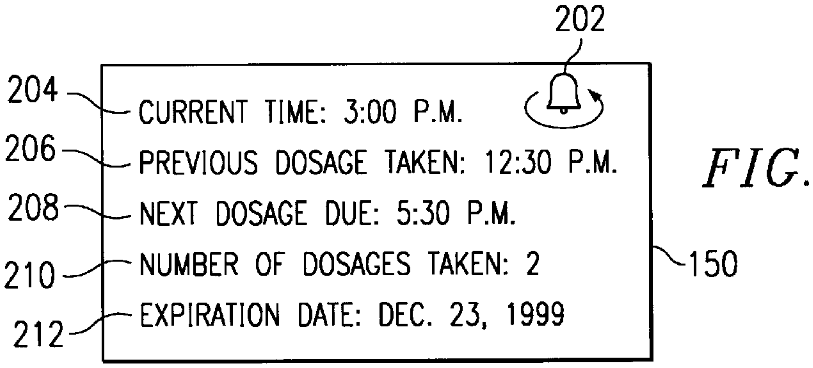
FIG. 11 shows a more detailed view of an exemplary display that may be attached to the preferred embodiment.

An example of a display 150 that may be contained on the device for storing and dispensing pills is shown in FIG. 11. As shown, display 150 may provide the current time 204. As shown, the current time is 3:00 p.m. Display 150 may also provide the time at which the previous dosage was taken 206. As shown, the previous pill was dispensed at 12:30 p.m. Display 150 may also provide the time at which the next dosage is due 208. As shown, the next dosage is due at 5:30 p.m. Display 150 may also provide the number of dosages taken 210, which, as explained above, may be automatically reset for each successive day. As shown, the number of dosages taken thus far is 2. Display 150 may also provide the expiration date for the pills contained therein 212. As shown, the expiration date for the pills contained therein is Dec. 23, 1999. Display 150 may also contain various indicators, such as bell 202, which may indicate that a reoccurring alarm has been set. Display 150 may also contain various keys (not shown) necessary for a user to enter information. Alternatively, display 150 may allow a user to input information by touching the display's screen, utilizing well known touch-screen technology.

The disclosed device for storing and dispensing solid-form medication may be made more child proof in a variety of ways. The device may be inherently child proof for very young children due to the requirement of performing multiple steps in an exact sequence to obtain a pill. That is, slide 118 must first be pulled outward and then returned to its initial position, and then trap door 126 must be opened in order to retrieve a pill. Some very young children may be unable to decipher this sequence of steps. Also, the device may be mounted on a wall out of the reach of children. Also, a locking mechanism may be placed on lid 102, slide 118, trap door 126, or any combination of those parts. Such a locking mechanism may be as simple as requiring a sequence of numbers be aligned before one or more of the parts may be opened, as the locking mechanisms commonly found on brief cases. Such a locking mechanism may be a locking device that requires a key to lock and unlock any one or more of the parts on the device.

If a funnel 302 as shown in FIG. 12 is provided at the top of hopper 106, assuming that funnel 302 is too narrow for a child to reach through, then a locking mechanism need only be placed on slide 118. Because funnel 302 prevents a pill from being retrieved through the top of the device, the only means left for retrieving a pill (without breaking the device) is through trap door 126. Additionally, a pill can only find its way to trap door 126 if slide 118 is first pulled outward and then returned to its initial/resting position. Therefore, by placing funnel 302 at the top of hopper 106 and a locking mechanism on slide 118, a pill cannot be retrieved without first unlocking slide 118.

Hole 112 at the bottom of hopper 106 is shown in FIGS. 1, 3, 5, 6–9, and 12 as a rectangular hole. Most preferably such hole is rectangular in shape, and is approximately ½ inch by 1 inch in size. However, the hole may be increased or decreased in size and still be within the scope of the present invention. Also, the hole may be different in shape, such as circular or square, and still be within the scope of the present invention. As an additional feature, the hole at the bottom of the hopper may be available in a variety of sizes in order to custom fit the size and/or shape of the hole to the size and/or shape of a particular pill. The hole may even be adjustable such that its size may be adjusted to adapt to different pills.

Hole 120 in slide 118 is shown in FIGS. 1, 4, 6–9, and 12 as a circular hole. Most preferably such hole is circular in shape, and is approximately 2 inches in circumference. However, the hole may be increased or decreased in size and still be within the scope of the present invention. Also, the hole may be different in shape, such as rectangular or square, and still be within the scope of the present invention. As an additional feature, the hole in the slide may be available in a variety of sizes in order to custom fit the size and/or shape of the hole to the size and/or shape of a particular pill. The hole's size may even be adjustable such that it may adapt to different pills.

Hole 122 in the bottom of slide drawer 114 is shown in FIGS. 1, 3, 5–9, and 12 as a circular hole. Most preferably such hole is circular in shape, and is approximately 2 inches in circumference. However, the hole may be increased or decreased in size and still be within the scope of the present invention. Also, the hole may be different in shape, such as rectangular or square, and still be within the scope of the present invention. As an additional feature, the hole in the bottom of the slide drawer may be available in a variety of sizes in order to custom fit the size and/or shape of the hole to the size and/or shape of a particular pill. The hole's size may even be adjustable such that it may adapt to different pills.

Most preferably, it is approximately 3 ½ inches from the top of the housing 101 to the bottom of hopper 106. That is, hopper 106 is approximately 3 ½ inches in height. Most preferably, hopper 106 is approximately 2 ½ inches in width and 2 ½ inches in depth near the top of hopper 106. Most preferably, the sides of hopper 106 taper inward as the bottom of hopper 106 is approached until the bottom of hopper 106 is approximately 1 ¼ inches in width and 1 ¼ inches in depth. However, the hopper may be increased or decreased in size and still be within the scope of the present invention.

Most preferably, slide drawer 114 is approximately ½ inch in height, approximately 1 ¼ inches in width, and approximately 2 ½ inches in depth. However, the slide drawer may be increased or decreased in size and still be within the scope of the present invention. Most preferably, slide 118 is approximately 1 inch in width, approximately ¼ inch in height, and approximately 2 ½ inches in depth. However, the slide may be increased or decreased in size (according to the size of the slide drawer) and still be within the scope of the present invention. Most preferably, slide handle 116 is approximately 1 ¾ inches in width, approximately ¼ inch in height, and protrudes approximately ¼ inch from the front of housing 101. However, the slide handle may be increased or decreased in size and still be within the scope of the present invention.

Most preferably, trap door 126 is approximately ¾ inches in height, approximately 1 inch in width, and approximately 2 ½ inches in depth. However, trap door 126 may be increased or decreased in size and still be within the scope of the present invention.

Although the present invention and its advantages have been described in detail, it should be understood that various changes, substitutions and alterations can be made herein without departing from the spirit and scope of the invention as defined by the appended claims.

What is claimed is:

1. An apparatus for storing and dispensing solid-form medication comprising:

a hopper for storing solid-form medication;

a slide drawer located below said hopper that provides an intermediate compartment through which at least one solid-form medication may be transported;

a moveable slide contained within said slide drawer for transporting at least one solid-form medication within said slide drawer;

a trap door that is located below said slide drawer and is coupled to the bottom of said slide drawer on the back side of said slide drawer in a manner that said trap door may be opened downward at the front of said slide drawer;

wherein said hopper includes a first aperture located in the bottom of said hopper that opens into said slide drawer;

said hopper includes at least one sloped inner wall to direct solid-form medication to said first aperture;

said slide having a second aperture;

said slide drawer having a third aperture located in the bottom of said slide drawer wherein said first aperture and said third aperture are not aligned;

said first aperture and said second aperture becoming aligned during a first movement of the said slide; and said second aperture and said third aperture becoming aligned during a second movement of the said slide.

2. The apparatus of claim 1 further comprising:

a lid that is rotatably coupled to the top of said hopper on the back side of said hopper in a manner that said lid may be opened upward at the front side of said hopper.

3. The apparatus of claim 1, wherein said first movement of the said slide is outward from the slide drawer, and said second movement of the said slide is inward within the slide drawer.

4. The apparatus of claim 1 wherein said first movement is outward from the slide drawer, the apparatus further comprising:

a stopper contained within said slide drawer to limit the first movement so that said slide is prevented from becoming detached from said slide drawer.

5. The apparatus of claim 4 further comprising:

said stopper being positioned such that when said slide is pulled outward to the point that said stopper prevents said slide from being pulled any further outward said second aperture is aligned with said first aperture.

6. The apparatus of claim 1, further comprising:

said slide being moveably attached to said slide drawer, wherein a spring is attached to said slide drawer and to said slide, and wherein said spring is relaxed when said slide is pulled inward and said spring provides tension as said slide is pulled outward.

7. The apparatus of claim 1, further comprising:

said slide being moveably attached to said slide drawer, wherein a spring is attached to said slide drawer and to said slide, and wherein said spring is relaxed when said slide is outward from said slide drawer and said spring provides tension as said slide is pushed inward.

8. The apparatus of claim 1, further comprising:

a spring that attaches said trap door to said slide drawer, wherein said spring is attached to said slide drawer and to said trap door, and wherein said spring is relaxed when said trap door is closed and said spring provides tension as said trap door is opened downward.

9. The apparatus of claim 1 further comprising:

a counter for counting the number of solid-form medication dispensed.

10. The apparatus of claim 1 further comprising:

a display attached to said hopper for displaying information to a user of said apparatus.

11. The apparatus of claim 10, further comprising:

a counter for counting the number of solid-form medication dispensed; and said display capable of showing said number of solid-form medication dispensed.

12. The apparatus of claim 10, further comprising:

said display capable of displaying a clock.

13. The apparatus of claim 10, further comprising:

an alarm for alerting a user to operate the apparatus to remind a user to take a solid-form medication.

14. The apparatus of claim 1, further comprising:

a means for mounting said device for storing and dispensing solid-form medication to a structure.

15. The apparatus of claim 1, wherein said solid-form medication is selected from the group consisting of:

pills, capsules, and tablets.

16. An apparatus for storing and dispensing solid-form medication comprising:

a hopper for storing solid-form medication;

a slide drawer located below said hopper that provides an intermediate compartment through which at least one solid-form medication may be transported;

a moveable slide contained within said slide drawer for transporting at least one solid-form medication within said slide drawer;

a trap door that is located below said slide drawer and is rotatably coupled to the bottom of said slide drawer on the back side of said slide drawer in a manner that said trap door may be opened downward at the front of said slide drawer;

a lid that is located on top of said hopper and is rotatably coupled to the top of said hopper on the back side of said hopper in a manner that said lid may be opened upward at the front side of said hopper;

a spring that attaches said trap door to said slide drawer, wherein said spring is attached to said slide drawer and to said trap door and wherein said spring is relaxed when said trap door is closed and said spring provides tension as said trap door is opened downward;

a first handle attached to said slide wherein said first handle protrudes out of said slide to allow said slide to be pulled outward or pushed inward within said slide drawer;

a second handle attached to said trap door for opening or closing said trap door;

a first stopper contained within said slide drawer to limit the amount that said slide may be pulled outward to prevent said slide from becoming detached from said housing;

a second stopper attached to said trap door to limit the opening of said trap door;

wherein said hopper includes a first aperture in the bottom of said hopper that opens into said slide drawer;

said hopper includes at least one sloped inner wall to direct solid-form medication to said first aperture;

said slide having a second aperture;

said slide drawer having a third aperture located in the bottom of said slide drawer that opens into said trap door wherein said first aperture and said third aperture are not aligned;

said first aperture and second aperture becoming aligned at some point as said slide is pulled outward within said slide drawer; and said second aperture and said third aperture becoming aligned at some point as said slide returns inward within said slide drawer.

17. The apparatus of claim 16 further comprising:

said first stopper being positioned such that when said slide is pulled outward to the point that said first stopper prevents said slide from being pulled any further outward said second aperture is aligned with said first aperture.

18. The apparatus of claim 16, further comprising:

said slide being moveably attached to said slide drawer, wherein a spring is attached to said slide drawer and to said slide, and wherein said spring is relaxed when said slide is pulled inward and said spring provides tension as said slide is pulled outward.

19. The apparatus of claim 16 further comprising:

a counter for counting the number of solid-form medication dispensed.

20. The apparatus of claim 16 further comprising:

a display attached to said hopper for displaying information to a user of said apparatus.

21. The apparatus of claim 20, further comprising:

a counter for counting the number of solid-form medication dispensed; and said display capable of showing said number of solid-form medication dispensed.

22. The apparatus of claim 20, further comprising:

said display capable of displaying a clock.

23. The apparatus of claim 20, further comprising:

an alarm for alerting a user to operate the apparatus to remind said user to take a solid-form medication.

24. The apparatus of claim 16, further comprising:

a means for mounting said device for storing and dispensing solid-form medication to a structure.

25. The apparatus of claim 16, wherein said solid-form medication is selected from the group consisting of:

pills, capsules, and tablets.

26. A method for dispensing solid-form medication, said method comprising:

storing solid-form medication in a hopper that has a first aperture located in the bottom of said hopper that opens into a slide drawer that located below said hopper;

moving a slide that has a second aperture outward within said slide drawer such that as said slide is moved outward said first aperture and said second aperture become aligned to allow at least one solid-form medication to fall into said slide drawer and be contained within said second aperture;

moving said slide inward within said slide drawer to transport said at least one solid-form medication within said slide drawer toward a third aperture located at the bottom of said slide drawer, wherein as said slide is moved inward said second aperture and said third aperture become aligned to allow said at least one solid-form medication to fall through said third aperture;

catching said at least one solid-form medication after said at least one solid-form medication falls through said third aperture in a trap door that is rotatably coupled to the bottom of said slide drawer in a manner that said trap door may be opened downward at the front of said slide drawer;

opening said trap door; and retrieving said at least one solid-form medication from said trap door.

27. The method of claim 26, further comprising:

counting the number of solid-form medication dispensed; and displaying said number of solid-form medication dispensed on a display attached to said hopper.

28. The method of claim 26, further comprising:

alerting a user to perform said step of moving a slide outward.

* * * * *